US008793259B2

(12) United States Patent  
Matsumura

(10) Patent No.: US 8,793,259 B2  
(45) Date of Patent: Jul. 29, 2014

(54) INFORMATION RETRIEVAL DEVICE, INFORMATION RETRIEVAL METHOD, AND PROGRAM

(75) Inventor: Norikazu Matsumura, Tokyo (JP)

(73) Assignee: NEC Biglobe, Ltd., Tokyo (JP)

( * ) Notice: Subject to any disclaimer, the term of this patent is extended or adjusted under 35 U.S.C. 154(b) by 311 days.

(21) Appl. No.: 12/543,273

(22) Filed: Aug. 18, 2009

(65) Prior Publication Data

US 2010/0057725 A1    Mar. 4, 2010

(30) Foreign Application Priority Data

Aug. 26, 2008  (JP) .................................. 2008-216509

(51) Int. Cl.  
*G06F 17/30*  (2006.01)

(52) U.S. Cl.  
USPC .......................................................... 707/749

(58) Field of Classification Search  
CPC ...................................................... G06F 17/30  
See application file for complete search history.

(56) References Cited

U.S. PATENT DOCUMENTS

| 6,212,517 | B1 * | 4/2001 | Sato et al. ...................... 707/749 |
| 2002/0133483 | A1 * | 9/2002 | Klenk et al. ...................... 707/3 |
| 2007/0011154 | A1 * | 1/2007 | Musgrove et al. ................ 707/5 |
| 2008/0147646 | A1 * | 6/2008 | Jaschek et al. ................... 707/5 |

FOREIGN PATENT DOCUMENTS

JP    2004-287827 A    10/2004

* cited by examiner

*Primary Examiner* — Belinda Xue  
(74) *Attorney, Agent, or Firm* — Sughrue Mion, PLLC

(57) ABSTRACT

In an exemplary aspect, the present invention includes a control unit that when a keyword for search is entered, collects texts containing that keyword from texts stored in a storage unit, extracts a noun of collected first texts, determines a noun partially matching with the keyword as a first word, extracts a second text containing that first word among the first texts, extracts a word from the second text, the word being one of a noun, a verb, and an adjective, counts the number of times an extracted word is used, determines a word whose number of times of use is placed in predefined highest ranks as a second word, the second word being a related word to the first word, and outputs the first word and the second word.

9 Claims, 10 Drawing Sheets

| WORD A | WORD C | ADD TO SEARCH WORD | UNNECESSARY FOR SEARCH |
|---|---|---|---|
| XYZ | ghi( ), jkl( ), ⋯ | ☐ | ☐ |
| UVW | mno( ), pqr( ), ⋯ | ☐ | ☐ |
| ⋮ | ⋮ | ⋮ | ⋮ |

ENTER A WORD (OR WORDS) WITH WHICH YOU WANT TO PERFORM SEARCH express
ekusupuresu(in katakana)
ekusupuresu(in hiragana)

RETURN    NEXT

TITLE: NEW-PRODUCT INFORMATION

CONTENTS: XX/XX, NEC ANNOUNCED A NEW-PRODUCT OF THE SERVER EXPRESS5800. THE SPECIAL-FEATURE OF THIS VERSION IS A PC AND . . .

Fig. 5

|  |  |  |  | NECESSARY TO ADD | UNNECESSARY TO ADD |
|---|---|---|---|:---:|:---:|
| EXPRESS5800 | NEC(100) | SERVER(85) | PC(50) | ○ |  |
| TSUKUBA-EXPRESS | TRAIN(85) | AKIHABARA(65) | TSUKUBA(30) |  | ○ |
| EXPRESS-RESERVATION | SHINKANSEN(60) | LIMITED-EXPRESS(40) | TRAIN(40) |  | ○ |
| ... |  |  |  |  |  |

*NUMBERS IN THE BRACKETS ( ) INDICATE THE NUMBERS OF TIMES OF USE

Fig. 6

<SEARCH EXPRESSION>

(EXPRESS OR ekusupuresu(in katakana) OR ekusupuresu(in hiragana) OR EXPRESS5800) NOT (TSUKUBA-EXPRESS OR EXPRESS-RESERVATION)

<RELATED WORD>

NEC SERVER PC ・・・

RETURN    COMFIRM

Fig. 7

<BLOG LIST>

TITLE: NEW-PRODUCT INFORMATION
CONTENTS: XX/XX, NEC ANNOUNCED A NEW-PRODUCT OF THE SERVER EXPRESS5800.
THE SPECIAL-FEATURE OF THIS VERSION IS A PC AND . . . .

TITLE: · · ·
CONTENTS: · · ·

Fig. 8

ENTER A WORD (OR WORDS) WITH WHICH YOU WANT TO PERFORM SEARCH express
ekusupuresu(in katakana)
ekusupuresu(in hiragana)

NOT

RETURN    NEXT

Fig. 9

| WORD A | WORD C | | | NECESSARY TO ADD | UNNECESSARY TO ADD |
|---|---|---|---|---|---|
| EXPRESS5800 | NEC (100) | SERVER (85) | PC (50) | ○ | |
| TSUKUBA -EXPRESS | TRAIN (85) | AKIHABARA (65) | TSUKUBA (30) | | ○ |
| EXPRESS -RESERVATION | SHINKANSEN (60) | LIMITED -EXPRESS (40) | TRAIN (40) | | ○ |
| ... | ... | ... | ... | | |

| WORD B | WORD D | | | NECESSARY TO ADD | UNNECESSARY TO ADD |
|---|---|---|---|---|---|
| NEC | ... | ... | ... | ○ | |
| SERVER | ... | ... | ... | ○ | |
| TRAIN | ... | ... | ... | | ○ |
| ... | ... | ... | ... | | |

Fig. 10

DAILY TABULATION

| RANK | 2008/1/1 | | | | 2008/1/2 | | | | ... |
|---|---|---|---|---|---|---|---|---|---|
| | | NUMBER OF CASES | PROBABILITY | RANKING POINT | | NUMBER OF CASES | PROBABILITY | RANKING POINT | |
| 1 | WORD A | 500 | 500/52000 | 5000 | WORD G | 600 | 600/56000 | 5000 | |
| 2 | WORD B | 480 | 480/52000 | 4999 | WORD A | 520 | 520/56000 | 4999 | |
| 3 | WORD C | 465 | 465/52000 | 4998 | WORD C | 490 | 490/56000 | 4998 | |
| 4 | WORD D | 450 | 450/52000 | 4997 | WORD I | 460 | 460/56000 | 4997 | |
| 5 | WORD E | 445 | 445/52000 | 4996 | WORD H | 440 | 440/56000 | 4996 | |
| 6 | WORD F | 440 | 440/52000 | 4995 | WORD F | 425 | 425/56000 | 4995 | |
| ... | | ... | ... | ... | | ... | ... | ... | |
| TOTAL | | 52000 | 52000/52000 | | | 56000 | 56000/56000 | | |

Fig. 13

TOTAL TABULATION (PERIOD : 2008/1/1~200X.X.X)

|  | TOTAL NUMBER OF CASES | RANK OF TOTAL NUMBER OF CASES | TOTAL SUM OF DAILY PROBABILITIES | TOTAL SUM OF RANKING POINTS |
|---|---|---|---|---|
| WORD A | 4200 | 1 | 0.075 | 34986 |
| WORD B | 2200 | 9 | 0.04 | 25179 |
| WORD C | 3600 | 2 | 0.064 | 34972 |
| WORD D | 2500 | 4 | 0.045 | 28462 |
| WORD E | 2000 | 12 | 0.036 | 22879 |
| WORD F | 1700 | 20 | 0.03 | 18068 |
| ⋮ | ⋮ | ⋮ | ⋮ | ⋮ |

Fig. 14

INFORMATION RETRIEVAL DEVICE, INFORMATION RETRIEVAL METHOD, AND PROGRAM

INCORPORATION BY REFERENCE

This application is based upon and claims the benefit of priority from Japanese patent application No. 2008-216509, filed on Aug. 26, 2008, the disclosure of which is incorporated herein in its entirety by reference.

BACKGROUND OF THE INVENTION

1. Field of the Invention

The present invention relates to an information retrieval device, an information retrieval method, and a program to be executed by a computer.

2. Description of Related Art

Using search to obtain information from Web pages and blogs has been becoming common practice (see Japanese Unexamined Patent Application Publication No. 2004-287827). In such search, users create a search expression by using AND, OR, and NOT conditions. Then, when referring to original texts hit in the search, if no information to be retrieved is displayed, they modify the search expression.

In such search, it is difficult to retrieve only web pages having contents that the users are seeking after. In particular, search results often include unrelated articles. For example, when search is performed with a term "note", a lot of articles that do not belong to the category of "note" that the user desires, such as stationery notebooks, names of cars (Note), titles of movies/cartoons (XX's note) and the likes, are also retrieved.

To perform search while preventing these plurality of topics from being mixed together, users may create a search expression using AND, OR, and NOT conditions in their own. However, it is very difficult for users to create such a search expression unless they have technical knowledge and are adept at searching (herein after referred to as "experts").

Furthermore, even if they are experts, a satisfactory search expression still cannot be created unless they repeat "try-and-error" during which actual searches are performed with various search expressions, original texts are perused, and search expressions are re-created and so forth.

The present invention has been made to solve problems existing in the above-described techniques, and an exemplary object of the invention is to provide an information retrieval device, an information retrieval method, and a program to be executed by a computer, which can relieve the load on the user when creating formula for information retrieval.

SUMMARY

To achieve the above-described object, an information retrieval device according to an exemplary aspect of the invention includes a control unit that: when a keyword for search is entered, collects texts containing that keyword from texts stored in a storage unit; extracts a noun of collected first texts; determines a noun partially matching with the keyword as a first word; extracts a second text containing that first word among the first texts; extracts a word from the second text, the word being one of a noun, a verb, and an adjective; counts the number of times an extracted word is used; determines a word whose number of times of use is placed in predefined highest ranks as a second word, the second word being a related word to the first word; and outputs the first word and the second word.

In another exemplary aspect of the invention, an information retrieval method includes: when a keyword for search is entered, collecting texts containing that keyword from texts stored in a storage unit; extracting a noun of collected first texts; determining a noun partially matching with the keyword as a first word; extracting a second text containing that first word among the first texts; extracting a word from the second text, the word being one of a noun, a verb, and an adjective; counting the number of times a word extracted from the second text is used; determining a word extracted from the second text whose number of times of use is placed in predefined highest ranks as a second word, the second word being a related word to the first word; and outputting the first word and the second word.

In another exemplary aspect of the invention, a program to be executed by a computer is a program that causes the computer to execute processes including: when a keyword for search is entered, collecting texts containing that keyword from texts stored in a storage unit; extracting a noun of collected first texts; determining a noun partially matching with the keyword as a first word; extracting a second text containing that first word among the first texts; extracting a word from the second text, the word being one of a noun, a verb, and an adjective; counting the number of times a word extracted from the second text is used; determining a word extracted from the second text whose number of times of use is placed in predefined highest ranks as a second word, the second word being a related word to the first word; and outputting the first word and the second word.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 3 shows an example of a search word verification window in accordance with a first exemplary example;

FIG. 4 shows an example of an input window for a keyword for search;

FIG. 5 shows an example of an inclusion blog;

FIG. 6 shows an example of a search word verification window in accordance with a first exemplary example of the invention;

FIG. 7 shows an example of related-word window;

FIG. 8 shows an example of a window in which blogs resulting from search are displayed;

FIG. 9 shows an example of a keyword input window in accordance with a second exemplary embodiment of the invention;

FIG. 10 shows an example of a search word verification window in accordance with a second exemplary embodiment of the invention;

FIG. 13 is a table showing an example of daily tabulation; and

FIG. 14 is a table showing an example of total tabulation for a certain period.

EXEMPLARY EMBODIMENT

First Exemplary Embodiment

A configuration to implement an information retrieval method in accordance with this exemplary embodiment of the invention is explained hereinafter.

Figure 1:
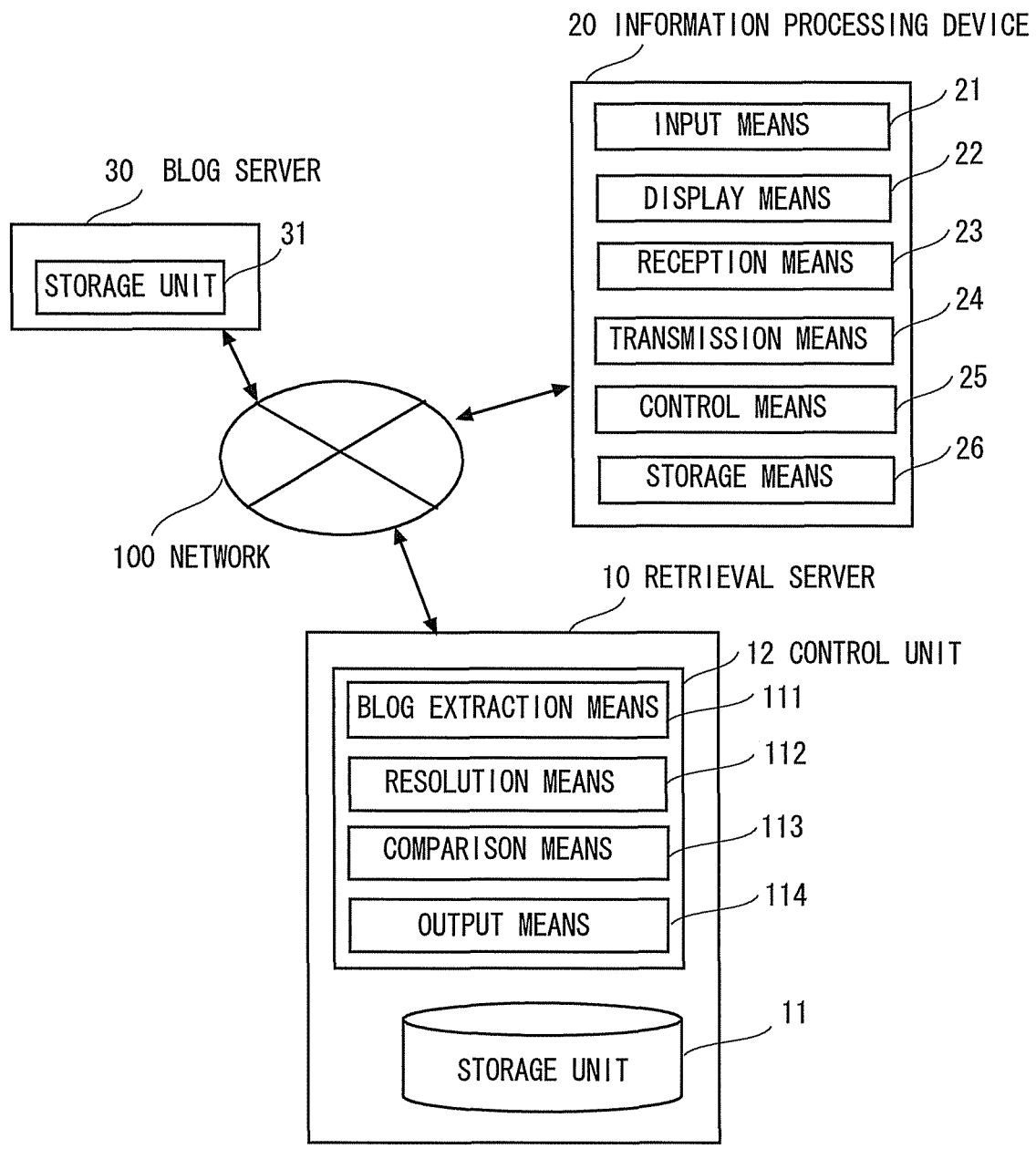
FIG. 1 is a block diagram for illustrating an information retrieval method in accordance with a first exemplary embodiment of the invention.

FIG. 1 is a block diagram for illustrating an information retrieval method in accordance with a first exemplary embodiment of the invention. As shown in FIG. 1, a retrieval server 10 and an information processing device 20 are connected through a network 100. The retrieval server 10 is an information retrieval device, and the information processing device 20 is a terminal that a user uses for information retrieval. In the network 100, information to be retrieved is stored in a storage unit 31, and a blog server 30 that can be available to public on the network is also connected. This storage unit 31 is an example of a storage unit in accordance with an exemplary aspect of the invention.

The retrieval server 10 includes a storage unit 11 and a control unit 12. A language analysis engine, i.e., application software to extract words from texts is registered in advance in the storage unit 11. The language analysis engine analyzes a written sentence (text) and resolves it into words with parts of speech. The control unit 12 includes a CPU (Central Processing Unit) (not shown) that executes predefined processes in accordance with a program, and a memory (not shown) that stores a program.

The control unit 12 also includes blog extraction means 111, resolution means 112, comparison means 113, and output means 114. These blog extraction means 111, resolution means 112, comparison means 113, and output means 114 are virtually configured in the retrieval server 10 by the execution of a program by the CPU. Detailed operations of each means will be explained with explanation for procedure of an information retrieval method.

The information processing device 20 includes input means 21 to receive an instruction from a user, display means 22 to display a result during search, reception means 23 to receive data from the retrieval server 10 through the network 100, transmission means 24 to transmit data to the retrieval server 10 through the network 100, control means 25 to control respective units, and storage means 26 to store information to be transmitted to and received from the outside. A browser, i.e., application software to display a window for search is registered in advance in the storage means 26.

Note that a unique identifier is assigned in advance to each of servers 10, 30 and information processing device 20 connected to the network 100. Further, identifiers each indicating the destination device and the source device are attached to every data exchanged between the retrieval server 10 and the information processing device 20.

Next, an information retrieval method by the retrieval server 10 in accordance with this exemplary embodiment of the invention is explained hereinafter.

Figure 2:
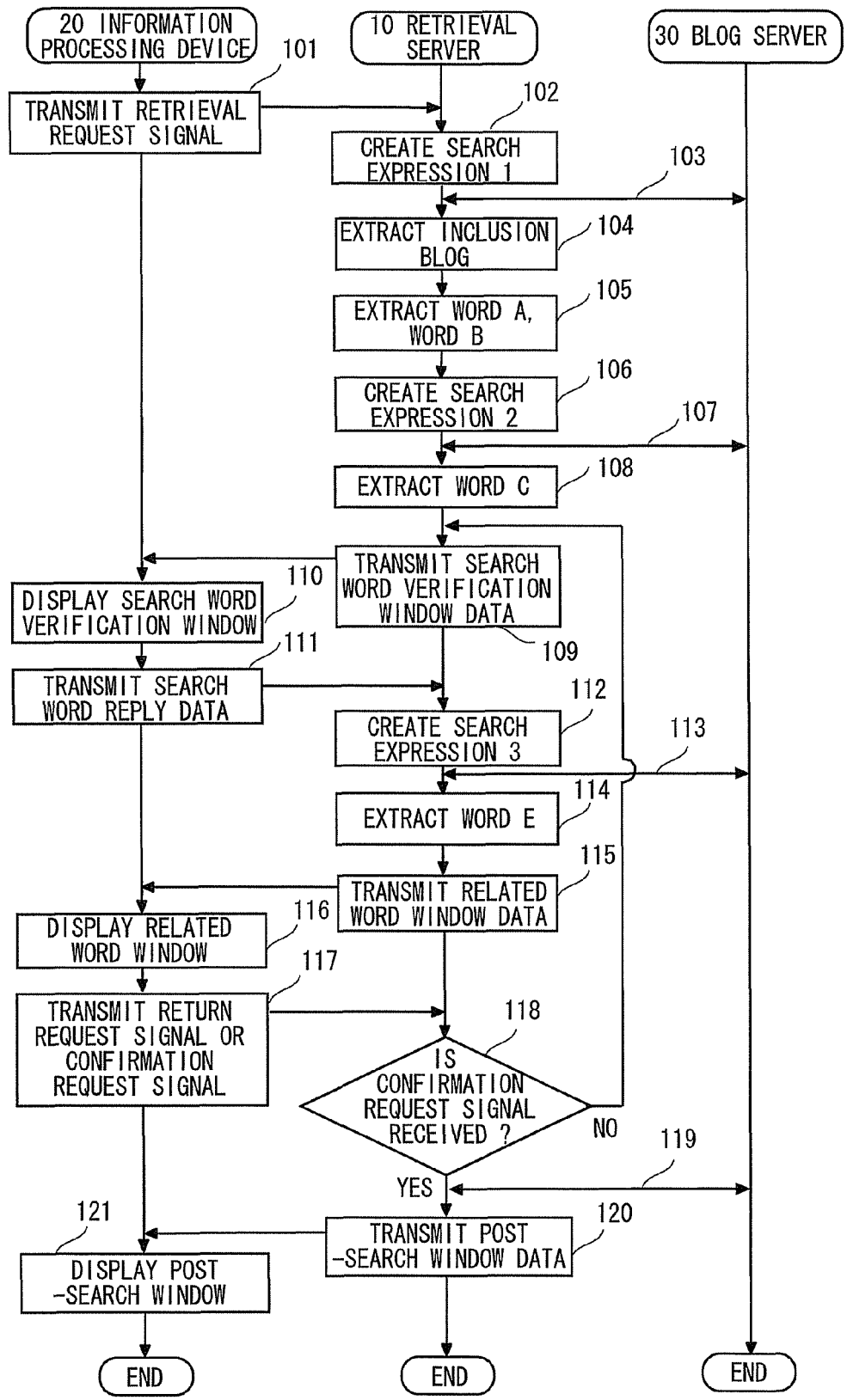
FIG. 2 is a sequence diagram showing an example of an information retrieval method in accordance with a first exemplary embodiment of the invention.

FIG. 2 is a sequence diagram showing an example of an information retrieval method in accordance with this exemplary embodiment.

When a user manipulates the input means 21 of the information processing device 20 and enters a keyword, the control means 25 transmits a retrieve request signal containing information about the keyword to the retrieval server 10 through the transmission means 24 (step 101).

When the retrieval server 10 receives the retrieve request signal from the information processing device 20 through the network 100, the blog extraction means 111 reads out the keyword from the retrieve request signal and creates a search expression 1 from the keyword (step 102). Further, the blog extraction means 111 performs search for blogs containing the keyword on blogs to be searched that are stored in the blog server 30 on the network 100 (step 103) and extracts blogs containing the keyword (step 104). In the following explanation, a blog containing a keyword is referred to as "inclusion blog".

The resolution means 112 resolves the title and sentences of the contents and the like of an inclusion blog extracted by the blog extraction means 111 into parts of speech, extracts nouns from the resolved parts of speech, and counts the number of times a noun is used for each extracted noun. These processes are performed for each of the inclusion blogs. These processes are carried out by executing a language analysis engine registered in the storage unit 11.

The comparison means 113 compares nouns extracted in the resolution means 112 with the keyword, and stores nouns that are partially matched with the keyword as words A in the storage unit 11 in a state where they are associated with the keyword and the number of times of use (step 105). The words A do not include words that are completely matched or are not matched at all. Since a word A is a word close to the keyword in terms of notation, the word A is referred to as "notation-fluctuated word".

Furthermore, the comparison means 113 also stores nouns that are not matched with the keyword at all in the comparison with the keyword as words B in the storage unit 11 in a state where they are associated with the keyword (step 105). Since a word B relates to the keyword though it is not matched with the keyword at all, the word B is referred to as "related word".

Next, the retrieval server 10 carries out the following operations in order to extract words C that are related words to the word A. A word C corresponds to "a related word to word A".

The blog extraction means 111 reads out a word A whose number of times of use is larger than a predetermined number or whose rank is higher than a predetermined value from the storage unit 11 and creates a search expression 2 from the search expression 1 and the word A (step 106). Further, the blog extraction means 111 performs search on the inclusion blogs (or blogs to be searched) with a word A stored in the storage unit 11 and extracts blogs containing the word A (step 107). The resolution means 112 resolves the titles and sentences of the contents and the like of inclusion blogs containing the word A extracted by the blog extraction means 111 into parts of speech, extracts nouns from the resolved parts of speech, and counts the quantity (it may include verbs and adjectives in addition to nouns, but an example including only nouns is explained for simplifying the explanation). The comparison means 113 compares the extracted nouns with the keyword or the word A, and stores nouns that are not matched as words C in the storage unit 11 in a state where they are associated with the word A (step 108).

The output means 114 reads out a word A and a word C that is associated with the word A and whose number of times of use is larger than a predetermined number or whose rank is higher than a predetermined value from the storage unit 11, and after adding an addition necessity check column in which whether the word A is added to the search words or not is entered, they are transmitted as search word verification window data to the information processing device 20 (step 109).

FIG. 3 shows an example of a search word verification window in accordance with this exemplary embodiment of the present invention. As shown in FIG. 3, a word A, words C relating to the word A, and an addition necessity check input column in which whether the word A is added to the search words or not is entered (hereinafter called "addition necessity check column") are arranged in a row. The addition necessity check column includes two columns, i.e., "add to search word" for a case where it is added to the search words and "unnecessary for search" for a case where it is not included in the search words.

In the second row of the table shown in FIG. 3, a word A"XYZ", words C "ghi( ), jkl( ), . . . ", and addition necessity check columns are displayed from the left to the right. In the third row, a word A "UVW", words C "mno( ), pqr( ), . . . ", and addition necessity check columns are, similarly to those in the first row, displayed from the left to the right. Although it is omitted in FIG. 3, the number of times the word C is used is displayed in the brackets "( )". The addition necessity check column is marked with a check mark or a circular mark or the like.

When the reception means 23 of the information processing device 20 receives search word verification window data through the retrieval server 10, the control means 25 causes the display means 22 to display a search word verification window based on the search word verification window data (step 110).

The user looks at the search word verification window, and if there is any word the user wants to add to the search words among the listed words A, the user ticks the "add to search word" of the addition necessity check columns in that row by manipulating the input means 21. On the contrary, if there is any word the user wants to exclude from the search words, the user ticks the "unnecessary for search" of the addition necessity check columns in that row by manipulating the input means 21. When two or more words that user wants to include in or exclude from the search, the user may make two or more ticks.

When the user enters an instruction for including or excluding a designated word A to or from the search words by manipulating the input means 21 in a manner described above and enters a transmission instruction, the information processing device 20 transmits search word reply data, to which a flag indicating that the designated word A is added to the search words or a flag indicating that it is not added to the search words is attached, to the retrieval server 10 through the transmission means 24 in response to the instruction from the user.

Upon receiving the search word reply data from the information processing device 20, the blog extraction means 111 of the retrieval server 10 creates a search expression (search expression 3) by adding a word A having a flag indicating that that word is added to the search words to OR and adding a word A having a flag indicating that it is not added to the search words to NOT based on the information in the search word reply data (step 112). Then, search is performed on the inclusion blogs (or blogs to be searched) with the search expression 3 (step 113), and blogs are extracted. The search expression is associated with the keyword and stored in the storage unit 11.

The resolution means 112 resolves the titles and sentences of the contents and the like of the blogs extracted by the blog extraction means 111 into parts of speech, extracts nouns from among the resolved parts of speech, and counts the quantity.

The comparison means 113 compares extracted nouns with the keyword and the added word A, and stores nouns that are not matched at all as words E (post-search related words) in the storage unit 11 in a state where they are associated with the keyword (step 114). The output means 114 transmits related-word window data containing the words E and their numbers of times of use to the information processing device 20 (step 115).

When the reception means 23 of the information processing device 20 receives the related-word window data from the retrieval server 10, the control means 25 causes the display means 22 to display a related-word window in which the words E are displayed in font-sizes proportional to their numbers of times of use based on the related-word window data (step 116).

The user looks at the related-word window, and if the user determines that a word that does not relate to the search target is included, the user enters an instruction indicating that the process should be returned to the search word verification window in order to perform the search again by manipulating the input means 21. Upon receiving the instruction indicating that the process should be returned to the search word verification window, the control means 25 transmits a return request signal requesting that the process be returned to the search word verification window to the retrieval server 10 (step 117). When the retrieval server 10 determines that the signal received from the information processing device 20 to be the return request signal (step 118), the process returns to the step 109 and the output means 114 transmits search word verification window data to the information processing device 20.

On the other hand, when the user looks at the related-word window and determines that only words relating to the search target are displayed in the related-word window, the user enters an instruction indicating the execution of search by manipulating the input means 21 in order to instruct the execution of the search expression. Upon receiving the instruction indicating the search execution, the control means 25 transmits a confirmation request signal requesting the confirmation of the search expression to the retrieval server 10 (step 117). When the retrieval server 10 determines that the signal received from the information processing device 20 to be the confirmation request signal (step 118), the retrieval server 10 extracts target blogs by executing the search expression created in the step 112 (step 119) and transmits post-search window data containing sentences of the blogs extracted by the search to the information processing device 20 (step 120). Upon receiving the post-search window data from the retrieval server 10, the information processing device 20 display a post-search window (step 121).

First Exemplary Example

A case where articles on a sever "Express5800" manufactured by NEC are retrieved is explained hereinafter. Note that the following steps are the same as those in the flowchart shown in FIG. 2.

FIG. 4 shows an example of a keyword input window for search. When a user enters an instruction requesting search by manipulating the input means 21 of the information processing device 20, a search initial window shown in FIG. 4 is displayed in the display means 22. Although the keyword input window is located in the initial window of a browser registered in the storage means 26 of the information processing device 20 in this example, the initial window may be provided by the retrieval server 10.

The user enters three words, i.e., "express", "ekusupuresu (in katakana)", and "ekusupuresu(in hiragana)" in the keyword input field shown in FIG. 4 by manipulating the input means 21. After that, when the "Next" button shown in FIG. 4 is selected, the information processing device 20 transmits a retrieval request signal containing these three keywords to the retrieval server 10 (step 101).

Upon receiving the retrieval request signal from the information processing device 20, the retrieval server 10 reads out the keyword from the retrieval request signal and creates the following search expression 1, which is used to extract target blogs.

express or ekusupuresu(in katakana) or ekusupuresu (in hiragana)   Formula 1

The retrieval server 10 extracts inclusion blogs with the search expression 1 from blogs available to public on the network 100.

FIG. 5 shows an example of an inclusion blog. The inclusion blog shown in FIG. 5 is a news article that is laid open to public on the network by NEC. The retrieval server 10 resolves the titles and sentences of the contents and the like of this blog into parts of speech. When each of the title and the contents is resolved, the Title becomes "new-product/information", and the Contents become " . . . XX/XX/./NEC/announced/a/new-product/of/the/server/Express5800/./The/special-feature/of/this/version/is/a/PC/and/ . . . "

Next, the retrieval server 10 extracts nouns from among the resolved parts of speech. The extracted nouns includes "new-product, information, NEC, Express5800, server, PC, . . . ". Furthermore, the number of times a noun is used in the inclusion blog shown in FIG. 5 is counted for each noun resolved in the above-described manner. By indicating the number of times of use for each noun in brackets "( )", the result was expressed as "new-product(2)," information(1), NEC(1), Express5800(1), server(1), PC(1), . . . ".

The retrieval server 10 counts the number of times of use for each noun for each inclusion blog extracted by the search expression 1. The result was expressed as "Express5800 (100), NEC(100), Tsukuba-Express(90), server(85), train (85), Akihabara(65), express-reservation(60), Shinkansen (60), PC(50), limited-express(40), train(40), TSUKUBA (30), . . . ". Note that "NEC", "Tsukuba-Express", and "Shinkansen" are registered trademarks.

The retrieval server 10 compares the extracted nouns with the keyword, and defines nouns that are partially matched with the keyword as words A. The words A include "Express5800(100), Tsukuba-Express (90), express-reservation (60), . . . ". In this example, three highest-ranked words having largest numbers of times of use are defined as words A for simplifying the explanation.

Meanwhile, words B include nouns extracted in the above-described manner with the exception of the words A. That is, the words B include "NEC(100), server(85), train(85), Akihabara(65), Shinkansen(60), PC(50), limited-express(40), train(40), TSUKUBA(30), . . . ".

In the step 106, the retrieval server 10 creates the following three search expressions 2 by logically multiplying the search expression 1 by words A.

(express or ekusupuresu(in katakana) or ekusupuresu (in hiragana)) and Express5800   Formula 2-1

(express or ekusupuresu(in katakana) or ekusupuresu (in hiragana)) and Tsukuba-Express   Formula 2-2

(express or ekusupuresu(in katakana) or ekusupuresu (in hiragana)) and express-reservation   Formula 2-3

The retrieval server 10 extracts nouns and obtains the number of times of use for each noun for each inclusion blog extracted by the Formula 2-1 in a similar manner to that used to obtain the words A. As a result, they were expressed as "NEC(100), server(85), PC(50), . . . " as listed in the decreasing order of the number of times of use. These words become words C that are the related words to "Express5800" (step 108). Similarly, words C that are the related words to "Tsukuba-Express" are obtained as "train(85), Akihabara (65), TSUKUBA(30), . . . " from all the inclusion blogs extracted by the Formula 2-2. Words C that are the related words to "express-reservation" are obtained as "Shinkansen (60), limited-express(40), train(40), . . . " from all the inclusion blogs extracted by the Formula 2-3.

In the step 109, the retrieval server 10 transmits search word verification window data, which is window data in which a word A, a word C whose rank is higher than a predetermined value, and an addition necessity check column used to indicate whether the word A is added to the search words or not are included, to the information processing device 20.

FIG. 6 shows an example of a search word verification window displayed in an information processing device.

In the first column of the table shown in FIG. 6, the words A, i.e., Express5800", "Tsukuba-Express", and "express-reservation" are listed from the top to the bottom. In the second column, words C corresponding to each of the words A are listed. In this example, three words having the highest numbers of times of use are listed as the words C. For example, "NEC, "server", and "PC" are listed as the words C for the word A "Express5800" in the first row.

Furthermore, addition necessity check columns are provided in the third and fourth columns.

The third column is a column indicating that an addition is "necessary" when the word A should be added to the search words, and the fourth column is a column indicating that an addition is "unnecessary" when the word A should be excluded from the search words. When a user wants to add a word A to the search words, the user marks its addition "necessary" column. On the other hand, when the user wants to exclude a word A from the search words, the user marks its addition "unnecessary" column. The user may determine whether a word A is added to the search words or not by referring to the words C.

In the example shown in FIG. 6, a circular mark is added in the addition "necessary" column for "Express5800", and circular marks are added in the addition "unnecessary" columns for "Tsukuba-Express" and "express-reservation".

When the retrieval server 10 receives the search word reply data in which the information whether the addition is necessary or unnecessary is added to the search word verification window as shown in FIG. 6, it creates the following search expression 3 in which the information whether the addition is necessary or unnecessary is reflected by adding the word A to be added to the search words, i.e., "Express5800" to OR of the search expression 1 and further adding the words A to be not added to the search words, i.e., "Tsukuba-Express" and "express-reservation" to NOT of the search expression 1 (step 112).

(express or ekusupuresu(in katakana) or ekusupuresu (in hiragana) or Express5800) not (Tsukuba-Express or express-reservation)   Formula 3

The retrieval server 10 extracts nouns and obtains the number of times of use for each noun for each inclusion blog extracted by the Formula 3 in a similar manner to that used to obtain the words A. As a result, they were expressed as "NEC (100), server(85), PC(50), . . . " as listed in the decreasing order of the number of times of use. These words become words E that are the post-search related words (step 114).

In the step 115, the retrieval server 10 transmits related-word window data containing the words E and their numbers of times of use, and information about the search expression 3 to the information processing device 20. Upon receiving the related-word window data from the retrieval server 10, the information processing device 20 displays the words E in font-sizes proportional to their numbers of times of use in the related-word window based on the related-word window data (step 116). Furthermore, the search expression 3 is also displayed in the related-word window.

FIG. 7 shows an example of a related-word window.

As shown in FIG. 7, the search expression 3 is displayed at the top of the window. Two buttons are displayed at the bottom of the window. One of the buttons is "return" and the other is "confirm". The words E are displayed as related words in the middle of the window. Among the words, "NEC" has the largest font-size, "server" has the second largest font-size, and "PC" has a font size smaller than that of "server". This is because they correspond to the numbers of times of use for the respective words. The larger the number of times of use is, the larger the font-size of that word becomes. Further, the smaller the number of times of use is, the smaller the font-size of that word becomes By displaying words in such a manner that their font-sizes become larger with increase in their relevance, it is possible to determine whether or not the search has been performed in a more proper manner.

When the user selects "confirm" in the related-word window in FIG. 7 by manipulating the input means 21 of the information processing device 20, the information processing device 20 transmits a confirmation signal to the retrieval server 10. Upon receiving the confirmation signal from the information processing device 20, the retrieval server 10 acquires information about the target blogs through the network 100 and transmits blog window data containing the information about the blogs to the information processing device 20. FIG. 8 shows an example of a window in which blogs resulting from the search are displayed. As shown in FIG. 8, the retrieved blogs are displayed in order.

Meanwhile, when a word that has no relevancy is included in the search words shown in the window in FIG. 7 and therefore the user select "return" by manipulating the input means 21 of the information processing device 20, the process returns to the step 112 and the user can add the word the user wants to exclude to the NOT condition.

In the above-described retrieval method, it can be seen that the operations a user needs to do are only the following simple operations.

Operation 1: enter a keyword a user can think of with regard to the search target.

Operation 2: select related/unrelated for words A (notation-fluctuated words) by referring to words C that are displayed simultaneously with the words A.

Operation 3: determine whether or not displayed words E (post-search related words) have any relation to what the user wants to retrieve.

Operation 4: when any word that has no relation is included, return to the operation 2 and repeat the operations. If all the displayed words are relevant, the editing of the search expression is completed and search is performed with the edited search expression.

Furthermore, the following is a summary of the extraction method for each of the words A, B and C.

(Extraction Method of Word A)
(i) Extract texts with input search condition.
(ii) Extract words from the texts on a word-by-word basis by a language analysis engine.
(iii) List the words, among the nouns, from the word with the largest number of appearances (highest-frequency word) in the decreasing order of the number of times of use.
(iv) Examining whether it is hit with the input search condition for each word by matching. When words are completely matched, they are deleted. Further, when words are partially matched, they are displayed as words A. The word A corresponds to a first word in an exemplary aspect of the present invention.

For example, since "express" is completely matched with the search expression, it is deleted. In contrast, since "Express5800" is partially matched, it is displayed as a word A.

(Extraction Method of Word B)

After similar steps to the steps (i) to (iii) of the word A are carried out, determine whether it is hit in the input search condition for each word by matching. If it is not matched, it is displayed as a word B. The word B corresponds to a third word in an exemplary aspect of the present invention.

(Extraction Method of Word C)
(i) Extract text blogs with [(input search condition) and (word A)].
(ii) Carry out similar steps to the steps (ii) and (iii) of the extraction method of a word A. The word C corresponds to a second word in an exemplary aspect of the present invention.

In accordance with this exemplary embodiment of the invention, a candidate word that could provide a clue to the creation of a search expression is displayed, so that the number of man-hours that the user needs to spend to create the search expression can be reduced and thereby relieving the load on the user. A user can perform more accurate search by repeating interaction with the retrieval server even when the user has no or little technical knowledge about search.

Note that all the created search expressions may be stored in the storage unit 11, so that when another user performs similar search, the retrieval server 10 may recommend the user the search expressions stored in the storage unit 11. Using search expressions created in the past can not only relieve the loads on users but also relieve the loads on the calculation processing by the retrieval server 10.

Second Exemplary Embodiment

In a second exemplary embodiment of the invention, blogs to be retrieved can be collected more efficiently in comparison to the first exemplary embodiment by enhancing search conditions entered by a user.

In a retrieval method in accordance with this exemplary embodiment, a user performs the following operations.

Operation 1: enter a keyword (AND, OR condition) a user can think of with regard to a search target, and set prohibited words (NOT condition). FIG. 9 shows an example of a keyword input window in accordance with this exemplary embodiment of the invention. In the window shown in FIG. 9, an input field for prohibited words is added in the window shown in FIG. 4.

Operation 2: select related/unrelated for displayed words A (notation-fluctuated words) and words B (related words).

Operation 3: update the data, and re-calculate and re-display the words A and words B.

Operation 4: if there are too many unrelated words, return to the operation 1 and remove a word causing the problem from the search expression. If it is at a correctable level, return to the operation 2 and repeat the processes. If all the displayed words are relevant, the editing of the search expression is completed and search is performed with the edited search expression.

Operations of the retrieval server 10 involved in the above-described operations are explained hereinafter.

After words B are obtained at the step 105 in the sequence diagram shown in FIG. 2, the retrieval server 10 extracts words D, i.e., related words to the words B at the step 108 in the following manner.

The blog extraction means 111 creates a search expression 4 from the search expression 1 and the words B, performs search on inclusion blogs with the words B stored in the storage unit 11, and extracts blogs containing the words B. By taking the first exemplary example of the invention as an example for the search expression 4, the search expression 4 is expressed as follows.

(express or ekusupuresu(in katakana) or ekusupuresu (in hiragana)) and NEC   Formula 4

The resolution means 112 resolves the titles and sentences of the contents and the like of the inclusion blogs containing words B that is extracted in the blog extraction means 111 into parts of speech, extracts nouns from the resolved parts of speech, and counts the quantity (it may include verbs and adjectives in addition to nouns, but an example including only nouns is explained for simplifying the explanation). The comparison means 113 compares the extracted nouns with the keyword or the words B, and stores nouns that are not matched as words D in the storage unit 11 in a state where they are associated with the words B. In the case of the Formula 4, the words D become "server(85), PC(50), . . . " as the related words to the word B, i.e., "NEC".

When the retrieval server 10 extracts the words 10 in the above-described manner, the output means 114 reads out, in addition to the table shown in FIG. 6, words B and words D that are associated with the word B and whose number of times of use is larger than a predetermined number or whose rank is higher than a predetermined value from the storage unit 11, adds information about the table to which an addition necessity check column that is used to enter information whether or not the word B is added to the search words is added to the search word verification window data, and transmits the search word verification window data to the information processing device 20 (step 109).

FIG. 10 shows an example of a search word verification window in accordance with this exemplary embodiment of the invention. There are two tables in the window shown in FIG. 10, and a table similar to that of FIG. 6 is displayed on the upper side. In the table on the lower side, the words B, the words D, and the addition necessity check columns are arranged such that they correspond to the respective words B.

A user can obtain information about the words D, i.e., related words to the words B, in addition to information about the words A and words C, from the search word verification window shown in FIG. 10. Further, it is possible to reply information whether or not the words B are also added to the search words to the retrieval server 10.

In this exemplary embodiment of the invention, by increasing the amount of information about conditions for search, it is possible to reduce the number of interactions with the retrieval server 10, and thus improving the efficiency of the search.

The following is a summary of the extraction method for words D by the retrieval server 10.
(Extraction Method of Word D)
(i) Extract text blogs with [(input search condition) and (word B)].
(ii) Carry out similar steps to the steps (ii) and (iii) of the extraction method of a word A in accordance with the first exemplary embodiment of the invention. The word D corresponds to a fourth word in an exemplary aspect of the present invention.

Third Exemplary Embodiment

A third exemplary embodiment of the invention is configured such that any general-purpose word is not included in high-ranks of the words C extracted in the first exemplary embodiment and the words B and words D extracted in the second exemplary embodiment. The "general-purpose word" means a word that is commonly used in sentences. The general-purpose words include, for example, "time", "blog", and "diary".

In this example, a case of a batch process where blogs that are published or updated within a certain period are retrieved is explained.

Figure 11:
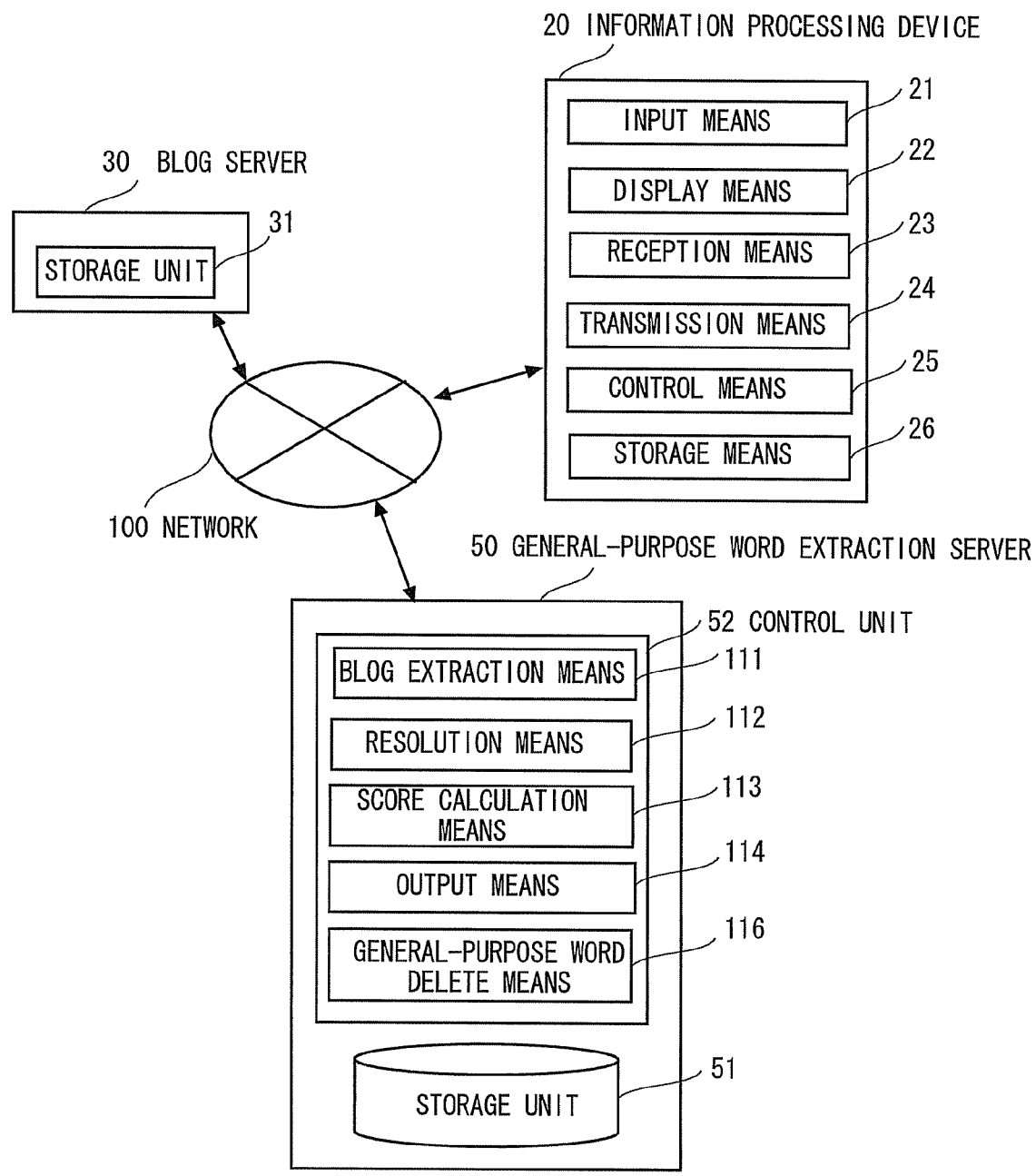
FIG. 11 is a block diagram for illustrating a general-purpose word extraction method in accordance with a third exemplary embodiment of the invention.

FIG. 11 is a block diagram for illustrating a general-purpose word extraction method in accordance with this exemplary embodiment of the invention. Note that the same signs are assigned to similar components and structures to those of the first or second exemplary embodiments.

As shown in FIG. 11, a general-purpose word extraction server 50 and an information processing device 20 are connected through a network 100. A blog server 30 in which blogs used to extract general-purpose words are stored is connected to the network 100.

The general-purpose word extraction server 50 includes a storage unit 51 and a control unit 52. A language analysis engine is registered in advance in the storage unit 51. The control unit 52 includes a CPU (not shown) that executes predefined processes in accordance with a program, and a memory (not shown) that stores a program. The control unit 52 also includes blog extraction means 111, resolution means 112, score calculation means 115, output means 114, and general-purpose word delete means 116. These blog extraction means 111, resolution means 112, calculation means 115, output means 114, and general-purpose word delete means 116 are virtually configured in the general-purpose word extraction server 50 by the execution of a program by the CPU. Detailed operations of each means are explained with explanation for general-purpose word extracting operation procedure.

Figure 12:
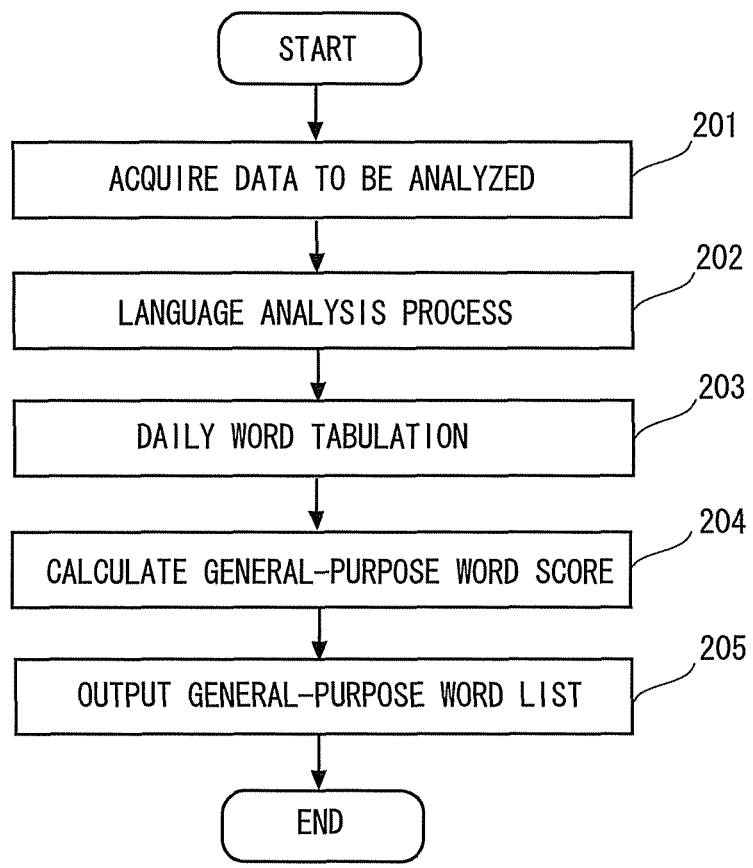
FIG. 12 is a flowchart illustrating operation procedure of a general-purpose word extraction server.

Next, general-purpose word extracting operation procedure by the general-purpose word extraction server 50 in accordance with this exemplary embodiment of the invention is explained hereinafter. FIG. 12 is a flowchart illustrating operation procedure of the general-purpose word extraction server.

When a user enters a period for target blogs from which the user wants to extract general-purpose words by manipulating the input means 21 of the information processing device 20, the control means 25 of the information processing device 20 transmits a general-purpose word extraction signal containing the entered period and information indicating the request of the extraction of general-purpose words to the general-purpose word extraction server 50. The period for target blogs from which the user wants to extract general-purpose words is, for example, a period that starts from the present and goes back 1 to 2 years.

When the general-purpose word extraction server 50 receives the general-purpose word extraction signal from the information processing device 20, the blog extraction means 111 reads out a designated period from the general-purpose word extraction signal, extracts blogs that are posted within the read period from the blog server 30, reads out the dates of the extracted blogs (posted dates of the blog articles), the tiles of the articles, and the bodies of the articles, and stores them in the storage unit 51 (step 201).

Next, the resolution means 112 extracts words from all the obtained blog articles (titles+bodies) on a word-by-word basis by using a language analysis engine. In doing so, since the titles have higher importance, the weights of words that are extracted from the tiles are increased. For example, a process in which the number of times of use of a word is tripled is carried out. Note that similarly to the first and second exemplary embodiments, written sentences are analyzed and resolved into words with parts of speech (e.g., blogs/nouns and the likes) by the language analysis engine.

Next, the score calculation means 115 performs a daily word tabulation process in which words that are resolved in the language analysis process by the resolution means 112 is tabulated on a daily basis (step 203) Then, a date, ranking, a word, and a number of cases are grouped and output, and stored in the storage unit 51. The following is an example of an output in the cases of 2008/01/01 and 2008/01/02.
2008/1/1 1st-rank "blog" 500 cases
2008/1/1 2nd-rank "time" 480 cases
. . .
2008/1/2 1st-rank "holiday" 600 cases
2008/1/2 2nd-rank "time" 580 cases
. . .

In the above-described example, a word "blog" is used in 500 cases and ranked in the first place on 2008/01/01 on a daily basis. Furthermore, a word "holiday" is used in 600 cases and ranked in the first place on 2008/01/02 on a daily basis.

Next, the score calculation means 115 calculates scores of ranked words in order to extract general-purpose words (step 204). One of three methods can be used for the score calculation method, but those methods are explained later. The conditions for general-purpose word include the following two conditions.

Condition 1: they must be words that appear very frequently in blogs.

Condition 2: they must be words that are regularly used (words with small fluctuations in the frequency of daily appearance).

After that, the output means 114 creates a general-purpose word list in which the words are sorted in descending order of their scores calculated in the step 204, and registers the general-purpose word list in the storage unit 51 (step 205). The general-purpose word list corresponds a list in which words to be removed from the search are listed. Furthermore, the output means 114 notifies information indicating that a general-purpose word list is registered to the information processing device 20.

The three general-purpose word score calculation methods are explained hereinafter.

A first method uses an amount of information and the number of appearances of a word. A general-purpose word score calculating formula for a word w is expressed as follows.

$$\text{Score}(w) = \alpha F(w) \times (1 + \log T(w)) \times \Sigma Ht(w) \qquad \text{Formula 5}$$

In the formula, α is a score adjustment constant. F(w) represents the total number of appearances of the word w in the whole target period. T(w) represents the number of periods in which the word w is used. ΣHt(w) is the total sum of the information amounts (degree of variation) for each period. t is a date within a designated period.

For example, information entropy or the like may be used for Ht(w) in Formula 5. An example of Ht(w) is shown bellow.

$$Ht(w) = -Ft(w)/F(w) \times \log(Ft(w)/F(w)) \qquad \text{Formula 6}$$

Ft(w) in Formula 6 represents the number of appearances of the word w on date t.

Next, a second method is explained. A second method uses an amount of information and the probability of appearance of a word. A general-purpose word score calculating formula for a word w is expressed as follows.

$$\text{Score}(w) = \alpha P(w) \times (1 + \log T(w)) \times \Sigma Ht(w) \qquad \text{Formula 7}$$

P(w) represents the total sum of the daily appearance probability of the word w in the whole period (=ΣFt(w)/Ft, t=min, min+1, . . . ). Ft represents the total sum of the numbers of appearances for all the words on date t. T(w) and α are the same as that of the first method.

For example, information entropy or the like may be used for Ht(w) in Formula 7. An example of Ht(w) is shown bellow.

$$Ht(w) = -Pt(w)/P(w) \times \log(Pt(w)/P(w)) \qquad \text{Formula 8}$$

Pt(w) in Formula 8 represents the probability of appearance of the word w on date t (=Ft(w)/Ft).

Next, a third method is explained. A third method uses an amount of information and the rank of the number of appearances of a word. A general-purpose word score calculating formula for a word w is expressed as follows.

$$\text{Score}(w) = \alpha O(w) \times (1 + \log T(w)) \times \Sigma Ht(w) \qquad \text{Formula 9}$$

O(w) represents the total sum of the daily appearance ranking point of the word w in the whole period. The higher the rank is, the higher point is assigned. For example, 1st-rank: 5000 points, 2nd-rank: 4999 points, and so on. T(w) and a are the same as those of the first method.

For example, information entropy or the like may be used for Ht(w) in Formula 9. An example of Ht(w) is shown bellow.

$$Ht(w) = -Ot(w)/O(w) \times \log(Ot(w)/O(w)) \qquad \text{Formula 10}$$

Ot(w) in Formula 10 represents a daily appearance ranking point of the word w. The higher the rank is, the higher point is assigned. For example, 1st-rank: 5000 points, 2nd-rank: 4999 points, and so on.

The first method has an advantage that it requires a smaller calculation amount in comparison to the second and third methods. The second method requires a smaller calculation amount in comparison to the third method. In addition, the second method has another advantage that it is not affected by daily fluctuations in the total number (total blog numbers).

In addition to not being affected by daily fluctuations in the total number (total blog numbers), the third method can extract regularly-used words with higher accuracy than that of the second method. That is, it does not extract words that rapidly increase only during certain periods, and can extract only words that are constantly written in a constant amount. The "words that rapidly increase only during certain periods" include, for example, the names of sports events such as World Cup Soccer and Olympic Games, and the names of actors and actresses appearing in movies released at that moment and TV-dramas having high audience ratings.

Next, a case where a general-purpose word list created by the general-purpose word extraction server 50 in this exemplary embodiment of the invention is applied to an information retrieval method explained in the first or second exemplary embodiment is explained hereinafter. Note that the explanation will become the same regardless of whether the general-purpose word list is used in the first exemplary embodiment (words C) or the second exemplary embodiment (words B and words D). Therefore, only a case where it is used in the first exemplary embodiment (words C) is explained in the following explanation.

After the retrieval server 10 shown in FIG. 1 extracts the words C in the step 108 in the first exemplary embodiment of the invention, it transmits general-purpose word analysis request information containing search word verification window data and information indicating the analysis request of general-purpose words to a general-purpose word extraction server 50.

Upon receiving the general-purpose word analysis request information from the retrieval server 10, the general-purpose word delete means 116 of the general-purpose word extraction server 50 performs matching between the words in the search word verification window data and the general-purpose word list. By using the matching result, the weights of words corresponding to general-purpose words are lowered by using one of the following two methods.

(1) The output rank of a general-purpose word in the search word verification window is lowered by multiplying the score (number of times of use, number of cases) of the search word verification window data by the reciprocal of the general-purpose word score (1/general-purpose word score). The general-purpose word score is a score that increases with increase in the general-purpose word rank.

(2) A word that is matched with the general-purpose word in the matching is completely hidden from the search word verification window.

Note that a user may specifies such that general-purpose word analysis request information containing a word list and information indicating the analysis request of a general-purpose word is transmitted from the information processing device 20 to the general-purpose word extraction server 50. Furthermore, a user may also designate the way of outputting blog data from the information processing device 20.

As a different method from the above-described method, after the retrieval server 10 extracts the words C in the step 108 in the first exemplary embodiment of the invention, it may access to a general-purpose word list in the storage unit 51 of the general-purpose word extraction server 50 and lower the score (number of times of use, number of cases) of words C listed in the general-purpose word list.

This exemplary embodiment of the invention is not limited to the words C, but can be also applied to notation-fluctuated words, candidate lists of related words, words that sharply increase, or word lists created by extracting/collecting high-frequency words or the likes. Therefore, by removing general-purpose words from the extracted words placed in high ranks, words having higher relevancy are displayed in high ranks, and thus enabling users to arrive at the information to be retrieved more quickly.

Furthermore, even if a user does not create a general-purpose word list in his/her own in advance, unnecessary words are removed from the extraction/collection result by using a general-purpose word list when information extraction/collection is performed. Therefore, the readability of the analysis results of the extraction/collection is improved. Furthermore, since the non-displayed words (NG words) are automatically generated, the preparation loads on users are relieved. Furthermore, comprehensiveness of the general-purpose word is also improved.

Note that a case of a batch process of a general-purpose word extraction process is explained, the present invention is also applicable to automatic processes. Operations of an automatic process are briefly explained hereinafter.

It is configured to be automatically started and executed with a timer. For example, it is configured to be started at 12 o'clock midnight once every day.

The blog extraction means 111 acquires newly-added blog data. The data includes dates (posted dates of blog articles), the titles of articles, and the bodies of articles. Furthermore, it also reads out and obtains word statistics for the past data from the storage unit 51. In this way, it obtains information about dates, words, and frequencies (at least one of numbers of cases, ranks, and probabilities). The score calculation means 115 carries out the language analysis process of the step 202 and daily word tabulation process of the step 203 in order to calculate the word statistics of the latest blogs. After that, the score calculation means 115 carries out the general-purpose word score calculation process of the step 204 and registers the general-purpose word list created by the output means 114 in the storage unit 51.

Furthermore, although the general-purpose word extraction server 50 is provided separately from the retrieval server 10 in this exemplary embodiment of the invention, the retrieval server 10 may be equipped with the function of the general-purpose word extraction server 50.

Furthermore, the period during which the tabulation process is carried out to extract general-purpose words corresponds to a first predefined period in an exemplary aspect of the present invention. Furthermore, although a case where a "daily basis" is used as a "second predefined period" in an exemplary aspect of the present invention is explained for simplifying the explanation in this exemplary embodiment, the present invention is not limited to the daily basis and can be also applicable to any period shorter than the first predefined period, such as weekly and monthly bases. In the following exemplary examples, cases where a "daily basis" is also used as the second predefined period basis are explained for simplifying the explanation.

Furthermore, although a case where nouns are used as candidate words for general-purpose words is explained for simplifying the explanation in this exemplary embodiment of the invention, the words are not limited to nouns and they may include verbs and adjectives. In the following exemplary examples, candidate words for general-purpose words may be also any parts of speech including nouns, verbs, and adjectives.

Second Exemplary Example

In a second exemplary example, another example of the general-purpose word score calculation method for each of the first to third methods explained in the third exemplary embodiment of the invention is explained.

FIG. 13 is a table showing an example of daily tabulation. FIG. 13 shows results of 2008/01/01 and 2008/01/02 in a daily basis. FIG. 14 is a table showing an example of total tabulation for a certain period. FIG. 14 shows a result of total tabulation in a period from 2008/01/01 to 200X/XX/XX.

A first method using an amount of information and the number of appearances of a word is explained hereinafter with reference to FIGS. 13 and 14.

(First Method)

Words for which the total number of cases are placed in high ranks (predetermined number of cases or more) and fluctuations in the number of cases in daily tabulation is smaller (fluctuating within a predetermined range of the number of cases) are selected.

For example, words for which the total number of cases is greater than or equal to 2000 cases are extracted. Words a, b, c, d, . . . are selected from the table in FIG. 14.

Among these words, words a and c fluctuate within a range of ±50 cases on a daily basis (assuming that the half of the cases of the word b are less than 430 and the half of the cases of the word d are less than 400, assuming also that words other than the words a, b, c and d for which the total number of cases is greater than or equal to 2000 cases also fluctuate beyond the predetermined range). Therefore, the word a and word c are selected as general-purpose words.

Note that the fluctuation within a predetermined range of the number of cases is a difference of the number of cases from that of the previous day or a difference between the highest rank and the lowest rank of that word within the period. This fact also holds true for second and third methods.

(Second Method)

Next, a second method using an amount of information and the probability of appearance of a word is explained.

Words for which the total sum of daily probabilities are placed in high ranks (predetermined value or greater) and fluctuations in the daily tabulation of the probabilities is smaller (fluctuating within a predetermined range) are selected.

For example, words for which the total sum of daily probabilities is greater than or equal to a predetermined value of 0.04% are extracted. Words a, b, c, d, . . . are selected from the table in FIG. 14.

Among these words, the daily probabilities of words a and c fluctuate within a range of ±0.003% (assuming that the half of the probabilities of the word b are less than or equal to 0.0061 and the half of the probabilities of the word d are less than or equal to 0.005, assuming also that words other than the words a, b, c and d for which the total sum is greater than or equal to 0.04% also fluctuate beyond the predetermined range). Therefore, the word a and word c are selected as general-purpose words.

(Third Method)

Next, a third method using an amount of information and the rank of the number of appearances of a word is explained.

Words for which the total sum of ranking points are placed in high ranks (predetermined value or greater) and fluctuations in the ranking points of daily tabulation is smaller (fluctuating within a predetermined range) are selected.

For example, words for which the total sum of ranking points are placed in the highest ten ranks (or greater than or equal to a predetermined value of 25000) are extracted. Words a, b, c, d, . . . are selected from the table in FIG. 14.

Among these words, the daily ranking points of words a and c fluctuate within a range of ±8% (in the highest eight ranks) (assuming that the half of the ranking points of the word b are less than or equal to 4990 (lower than 11th rank) and the half of the ranking points of the word d are less than or equal to 4988 (lower than 13th rank), assuming also that words other than the words a, b, c and d for which the total sum is in the highest ten ranks also fluctuate beyond the predetermined range). Therefore, the word a and word c are selected as general-purpose words.

Third Exemplary Example

Although general-purpose words are extracted from all the blogs that are accessible on the network in the second exemplary example of the invention, general-purpose words are extracted from texts of one certain user or extracted from texts of a circle/group of people having a certain hobby in a third exemplary example. The exemplary example of the invention can be applied to profile analysis on an individual basis or on a group basis.

Note that except that blogs in a certain range, rather than all the blogs, are dealt with as blogs to be analyzed, i.e., as texts to be analyzed, the structures and operations of this exemplary example of the invention are similar to those of the above-described exemplary embodiments and exemplary examples, and therefore their explanation is omitted.

Although the above-described exemplary embodiments and exemplary examples are explained by using blogs as subjects of analysis, the analysis subjects are not limited to blogs but also include any accessible texts including information such as web pages, emails, and document files that are stored in servers or information processing devices, open or non-open to the public on the network, or sent to members. A storage unit in accordance an exemplary aspect of the invention may be storage mean 26 of the information processing device 20. Furthermore, even in the case where blogs are dealt with as subjects of analysis, the number of blog server 30 is not limited to one, and a plurality of blog servers 30 may be used.

The present invention can be applied to systems in which reputation of entered keywords concerning products and services and the likes in blogs and the likes are desired to be verified/analyzed.

Each of the above-described embodiments can be combined as desirable by one of ordinary skill in the art.

An exemplary advantage according to the above-described embodiments is that since candidate words that could provide a clue to the creation of a search expression is displayed, the number of man-hours that the user needs to spend to create the search expression can be reduced and thereby relieving the load on the user.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information retrieval device comprising:
   a computer;
   a control unit implemented at least by the computer and that:
   when a keyword for search is entered, collects first texts containing the keyword from texts stored in a storage unit implemented at least by the computer;
   extracts a noun of the collected first texts;
   determines a noun partially matching with the keyword as a first word;
   extracts a second text containing the first word, from the first texts;
   extracts a word from the second text, the word being one of a noun, a verb, and an adjective;
   counts a number of times the extracted word is used;
   determines, from the second text, a word having a number of times of use in predefined highest ranks as a second word, the second word being a related word to the first word;
   outputs the first word and the second word; and
   a memory unit implemented at least by the computer and that stores a general-purpose word list listing a plurality of words that are to be deleted from the words extracted from the second text,
   wherein the control unit lowers, with regard to the extracted word, a rank of a given word that matches with a word contained in the general-purpose word list or deletes the given word from the words extracted from the second text by referring to the general-purpose word list, the rank of the given word being lowered with respect to the number of times the given word extracted from the second text is used as counted, and the control unit determines a word other than the first word among nouns extracted from the first text as a third word, extracts a fourth text containing the third word from the first text, extracts a word that is at least one of a noun, a verb, and an adjective from the fourth text, counts the number of times the extracted word from the fourth text is used, determines a word having a number of times of use that is in predefined highest ranks as a fourth word that is a related word to the third word, and outputs the third word and the fourth word.

2. The information retrieval device according to claim 1, wherein when an instruction to remove at least one of output first words is input, the control unit re-extracts the first word and the second word from a third text and outputs the re-extracted first and second words from the third text, the third text being created by removing a text containing the first word to be removed from the first text.

3. The information retrieval device according to claim 1, wherein upon receiving a general-purpose word extraction request or at a predefined time, the control unit collects a text stored in the storage unit, extracts a word from the collected text, determines a word having an appearance frequency during a first predefined period is higher than a first predetermined value and having an appearance frequency during each second predefined period shorter than the first predefined period fluctuates within a second predetermined value range as a general-purpose word, and creates the general-purpose word list that is a list of the general-purpose word.

4. An information retrieval method comprising:
when a keyword for search is entered, collecting, by a computing device, texts containing the keyword from texts stored in a storage unit;
extracting, by the computing device, a noun of the collected first texts;
determining, by the computing device, a noun partially matching with the keyword as a first word;
extracting, by the computing device, a second text containing the first word from the first texts;
extracting, by the computing device, a word from the second text, the word being one of a noun, a verb, and an adjective;
counting, by the computing device, a number of times a word extracted from the second text is used;
determining from the second text, by the computing device, a word extracted from the second text having a number of times of use is placed in predefined highest ranks as a second word, the second word being a related word to the first word; and
outputting, by the computing device, the first word and the second word,
wherein
a word other than the first word among nouns extracted from the first text is determined as a third word,
a fourth text containing the third word is extracted from the first text,
a word that is at least one of a noun, a verb, and an adjective is extracted from the fourth text,
a number of times the word that is at least one of a noun, a verb, and an adjective is extracted from the fourth text is used is counted,
a word having a number of times of use that is in predefined highest ranks is determined as a fourth word that is a related word to the third word,
the third word and the fourth word are output,
a general-purpose word list listing a plurality of words that are to be deleted from the words extracted from the second text, and
with regard to the extracted word, a rank of a given word that matches with a word contained in the general-purpose word list is lowered or the given word is deleted from the words extracted from the second text by referring to the general-purpose word list, the rank of the given word being lowered with respect to the number of times the given word extracted from the second text is used as counted.

5. The information retrieval method according to claim 4, wherein when an instruction to remove one of output first words is input, the first word and the second word are re-extracted from a third text and the re-extracted first word and the second word from the third text are output, the third text being created by removing a text containing the first word to be removed from the first text.

6. The information retrieval method according to claim 4, wherein
upon receiving a general-purpose word extraction request or at a predefined time, a text stored in the storage unit is collected,
a word is extracted from the collected text,
a word having an appearance frequency during a first predefined period is higher than a first predetermined value and having an appearance frequency during each second predefined period shorter than the first predefined period fluctuates within a second predetermined value range is determined as a general-purpose word, and
the general-purpose word list that is a list of the general-purpose word is created.

7. A non-transitory computer-readable data storage medium storing a program to be executed by a computer, the program being configured to cause the computer to execute processes comprising:
when a keyword for search is entered, collecting texts containing the keyword from texts stored in a storage unit;
extracting a noun of collected first texts;
determining a noun partially matching with the keyword as a first word;
extracting a second text containing the first word among the first texts;
extracting a word from the second text, the word being one of a noun, a verb, and an adjective;
counting a number of times a word extracted from the second text is used;
determining from the second text a word extracted from the second text having a number of times of use is placed in predefined highest ranks as a second word, the second word being a related word to the first word;
outputting the first word and the second word;
determining a word other than the first word among nouns extracted from the first text as a third word;
extracting a fourth text containing the third word from the first text;
extracting a word that is at least one of a noun, a verb, and an adjective from the fourth text;
counting a number of times the word extracted from the fourth text is used;
determining a word having a number of times of use that is in predefined highest ranks as a fourth word that is a related word to the third word;
outputting the third word and the fourth word;
storing a general-purpose word list listing a plurality of words that are to be deleted from the words extracted from the second text; and
with regard to the extracted word, lowering a rank of a word that matches with a word contained in the general-purpose word list or deleting the word from the words extracted from the second text by referring to the general-purpose word list, the rank of the given word being lowered with respect to the number of times the given word extracted from the second text is used as counted.

8. The non-transitory computer-readable data storage medium according to claim 7, wherein the program is further configured to cause the computer to execute a process for, upon receiving an instruction to remove one of output first words, re-extracting the first word and the second word from a third text and outputting the extracted first and second words from the third text, the third text being created by removing a text containing the first word to be removed from the first text.

9. The non-transitory computer-readable data storage medium according to claim 7, wherein the program is further configured to cause the computer to execute processes for, upon receiving a general-purpose word extraction request or at a predefined time, collecting a text stored in the storage unit, extracting a word from the collected text, determining a word having an appearance frequency during a first predefined period is higher than a first predetermined value and having an appearance frequency during each second predefined period shorter than the first predefined period fluctuates within a second predetermined value range as a general-purpose word, and creating the general-purpose word list that is a list of the general-purpose word.

* * * * *